Oct. 16, 1956  G. R. ERICSON  2,766,517
TREATMENT OF WELDED STRUCTURES
Original Filed June 14, 1947  6 Sheets-Sheet 1

INVENTOR.

*George R. Ericson*

Oct. 16, 1956 G. R. ERICSON 2,766,517
TREATMENT OF WELDED STRUCTURES
Original Filed June 14, 1947 6 Sheets-Sheet 2

INVENTOR.

George R. Ericson

Oct. 16, 1956  G. R. ERICSON  2,766,517
TREATMENT OF WELDED STRUCTURES
Original Filed June 14, 1947  6 Sheets-Sheet 3
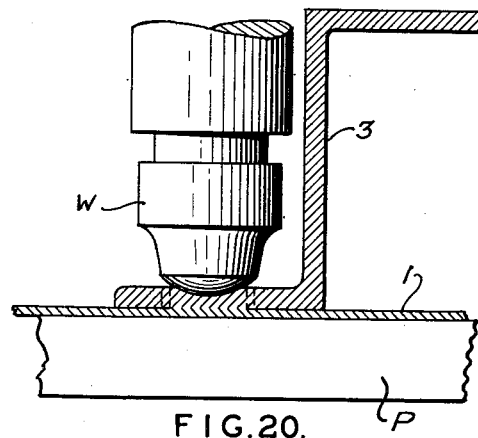
FIG.20.
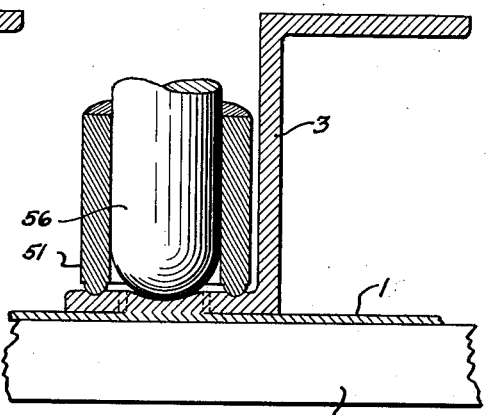
FIG.21.
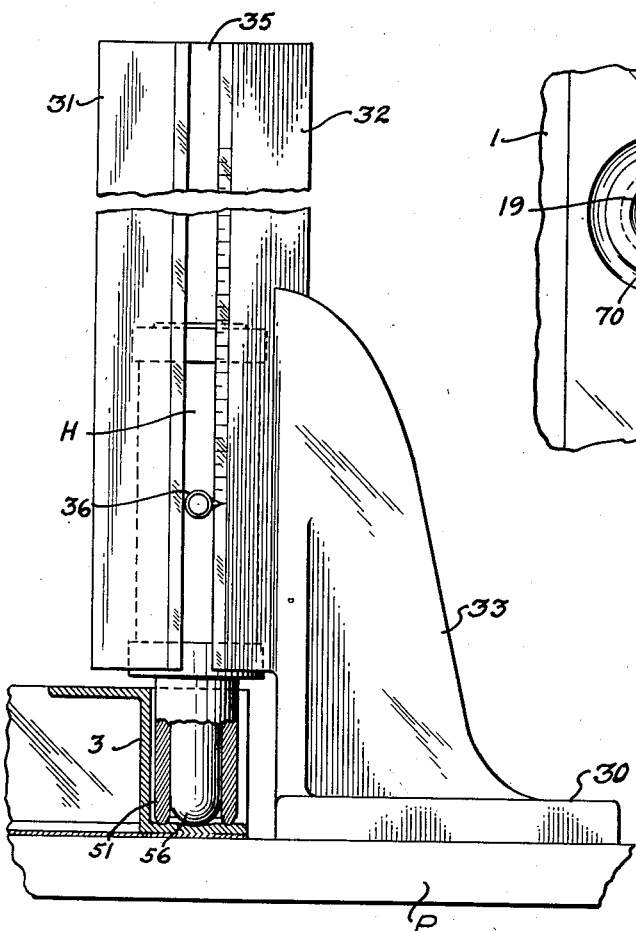
FIG.9.
FIG.22.
INVENTOR.
George R. Ericson

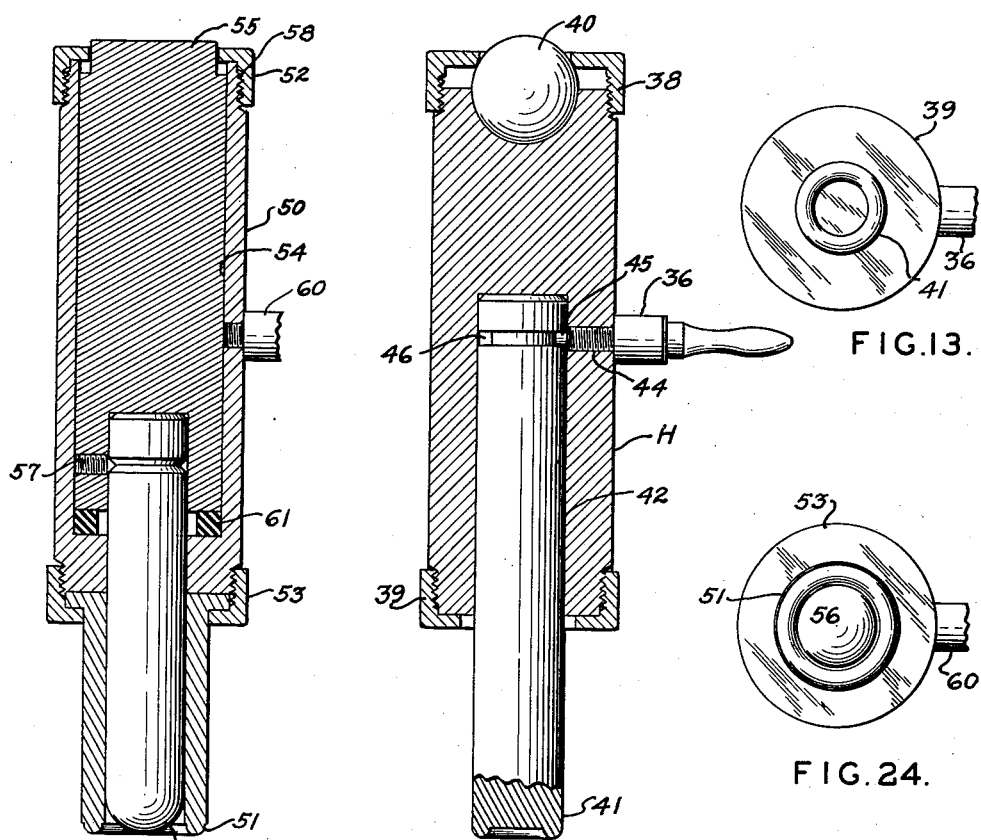

Oct. 16, 1956      G. R. ERICSON      2,766,517
TREATMENT OF WELDED STRUCTURES
Original Filed June 14, 1947      6 Sheets—Sheet 5
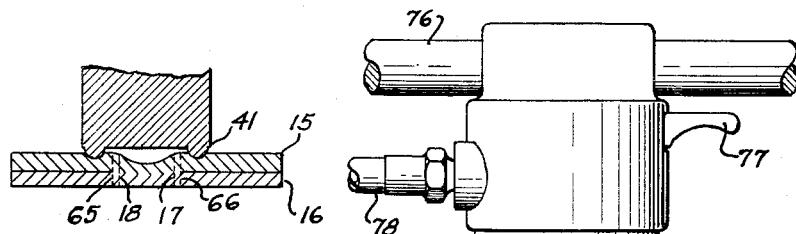
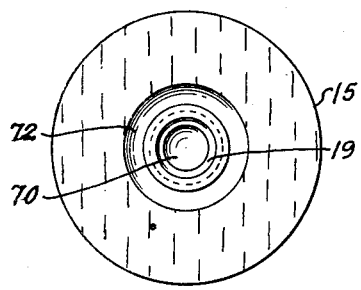
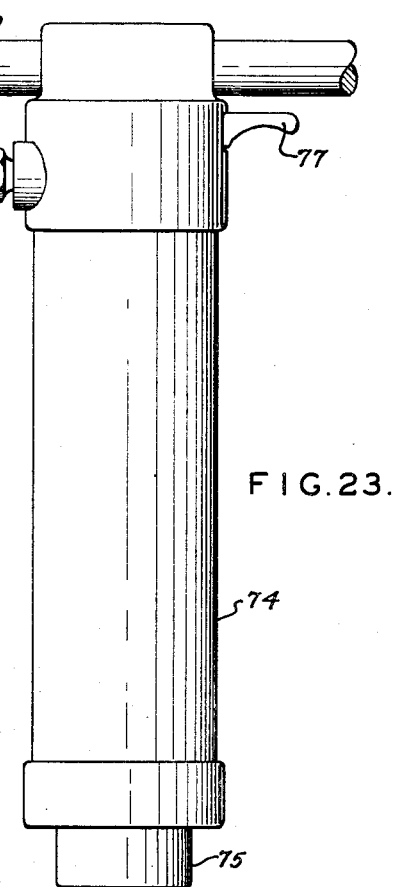
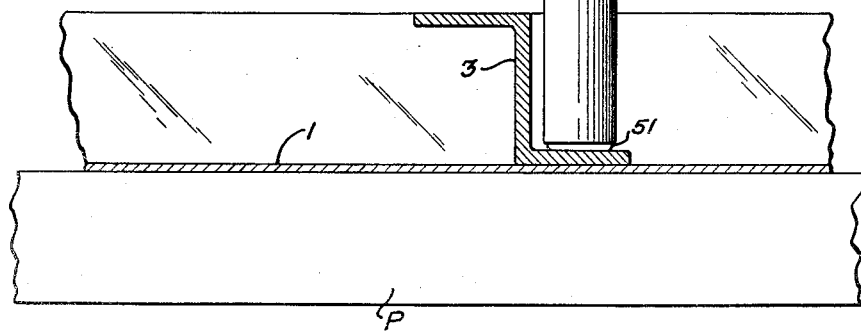
INVENTOR.

United States Patent Office 2,766,517
Patented Oct. 16, 1956

2,766,517

TREATMENT OF WELDED STRUCTURES

George R. Ericson, Kirkwood, Mo., assignor to ACF Industries, Incorporated, a corporation of New Jersey Continuation of abandoned application Serial No. 754,714, June 14, 1947. This application June 2, 1952, Serial No. 291,186

11 Claims. (Cl. 29—480)

This invention relates to the treatment of welded structures and, more particularly, to a method of treatment which can be relied upon to return welded structures to their original dimensions by relieving the stress and strain caused in those structures by the welding operation. The method has the advantage that it may be readily adapted to production operations, since, for the first time, it becomes practical to predetermine, by test, the proper treatment to eliminate the shrinkage in a single weld and apply the test results to a final product, thus eliminating the necessity of relying, in the first place, on the experience of the supervisor for the production article and, in the second place, upon the particular skill of the operator producing that article.

In order that the invention may be better understood, a typical production item will be described, together with the problems arising due to its fabrication by welding. The application of the treatment of this invention to eliminate those problems will be described in relation to this product.

Accordingly, applicant has chosen the fabrication and treatment of a railway car side panel. Those familiar with the construction employed in the railway art know that it is general practice to form car sides of a single, continuous steel sheet by spot-welding thereto the side framing members. The car side is prefabricated as a car sub-assembly by placing the side sheet face down on a large copper platen of a welding machine, clamping the structural framing members to the sheet and platen, and then spot-welding the members in place progressively as the platen traverses the multiple welding machine. This method of manufacturing welded car sides has undoubtedly proved highly satisfactory in every respect except that, when released from clamping engagement with the platen, buckles or ripples appear in the panel of the final product. Since the car side is generally flat, or has plane panel portions, these buckles are readily apparent to the eye and considerably detract from the appearance of the finished car side. No matter how small the buckles in the panels of the side sheet, they will become readily apparent after the final coat of paint has been applied because of the irregular reflections therefrom. Of course, after the car is completely assembled and painted, it is too late to do anything about removing the distortion in the side sheet.

It is also known to those familiar with the art of car building that many attempts to avoid this difficulty have been made, one of which is to attach reinforcements or stiffeners to the inside of the side sheet by welding these to the side sheet and the frame. This method is subject to the obvious objections of increased cost and weight, and also to the objection that the buckles, if any, in the finished side sheet are merely reinforced, thereby eliminating the possibility of treating the side sheet in any way.

Another method has been by heat treating and forging the panels to produce the proper shrinkage, or by completely eliminating the portion of the panel and replacing it. In order to obtain satisfactory results, these methods require highly skilled workmen, a great deal of time, and, accordingly, excessive costs.

This invention is based upon the discovery of the cause of the buckles or distortions in the side sheet. They appear to be caused by deformation of the heavier frame and lighter side sheets during the welding process. These deformations, in turn, are caused by a change in overall dimensions which sets up stresses bordering the separate, individual portions of the side sheet between the frame members, which form, in effect, individual small panels along the entire length of the car side. It appears that the change in dimensions results from an overall shrinkage extending along the line of the series of spot welds and by strains radiating from each of the individual welds, the cumulative effect of which is to decrease dimensions along the edges of each of the individual panels, or the side sheet as a whole. This cannot help but result in distortion of the final fabricated structure.

Once the cause has been recognized, it will be apparent that any method will be successful which, when applied to the finished product, will restore the dimensions of the structure along each line of welds to the prewelded condition. If this has ever before been realized, no suitable practice has been discovered to accomplish this result— at least none which is readily adapted to production methods and may be employed successfully by unskilled labor. Some attempts have been made to stretch the welded metal members by peening along the line of the weld, but this has been applied in an unsystematic manner which would not produce uniform results. It is a fact that such methods, although tried, have been abandoned.

Brief description of the method

This particular invention is suitable for many applications, but it is chosen to illustrate and describe the same applied in the fabrication of a spot-welded car side.

In building a spot-welded car side, a continuous side sheet is clamped tightly between a flat, unperforated table or platen and the assembled structural members forming the reinforcing side frame for the composite panel of the finished car side. When so mounted, the spot welding is done by applying the electrodes to the surface of the frame members and passing current through the relatively thick frame and thin side sheet to the copper table or platen. The finished product, when so fabricated, is a reinforced car side containing many hundreds of welds. During welding, the application of heat and pressure to the relatively heavy frame member causes the electrode to deform the metal adjacent the welding tip of the electrode, forming a readily identifiable concavity. The fact that the metal is deformed at high temperature and under pressure places a greater stress in the frame member than in the thin side sheet, which is immediately in contact with the cool, flat copper table or platen. Of course, during the welding, distortion of the welded structure is prevented by the clamps holding the side frame and side sheet to the platen, and usually no deformation will appear until the welding is finished and the clamps removed from the completely fabricated side panel. For this reason it is difficult to determine during this part of the process whether any particular part of the side sheet or frame is under internal local compression or tension. It follows, therefore, that there is no direct way to measure the amount of distortion or change in dimension at each weld, nor any way to observe accurately the effect of any step or steps which might be taken to remedy this condition locally.

In other words, since it is impossible to readily determine the direction and amount of dimension change due to local shrinkage, any steps taken to restore the original condition of the side frame and side sheet by the use of forging steps which will stretch the metal therein would be merely a hit and miss proposition. What is needed is an improved method of restoring the original dimensions which may be predetermined in its manner of application; otherwise, any stretching operation such as peening the spots directly for this purpose is useless, since anyone attempting to do so would immediately be confronted with the unsolved problem of the kind of hammer to use, and where and how hard to strike, where to start, and the manner in which the peening should progress with respect to the panel. In other words, if extruding or peening is applied along the line of the weld, it must be predetermined in amount and manner of application, since too much is bad and may produce larger buckles or ripples in the car panel than those caused by the welding itself. Prior to this invention, there was no ready solution suggested in the art, but it can be readily understood that if any such steps are to be applied to each spot-weld in a large sheet, the effect of its application to one of the welds would be so minute as not to be directly measurable in its effect on the large sheet.

Furthermore, the difficulty faced by the art, which prevented the effective correction by extruding or peening to eliminate the buckles, is the use of a hammer or press which does not leave scars on the side sheet or outer face of the car side panel. If such scars would result from the application of the method, at least they must be so small that it is economical to remove or cover them in the final product. Other difficulties will present themselves in the application of any such method, due to the variation in thickness, shape and size of the members. There has been no method of predicting the stresses and strains set up in the frame members by the welding, nor any satisfactory method of eliminating them or compensating for them if they were known.

The method herein disclosed is based on first predetermining the kind of treatment required to eliminate the average change in dimension due to stresses and strains likely to occur in each member; secondly, predetermining of the amount and point of application of the peening or extruding forces to be applied (by proper tests); and, thirdly, applying the test results to the completed structure. This method avoids the necessity of relying on any attempts to observe the effect of the method until it is complete.

The object of the invention is a method of peening or extruding applicable to spot-welded composite structures of sheet and structural frame which comprises a novel manner of testing to predetermine the character and amount of force to be applied in the final composite product to restore it to an unstressed condition.

Another object of the invention is a method of treating composite welded structures by an operation involving the application of predetermined forces at predetermined locations to restore the original dimensions.

Other objects of the invention will become apparent as the description proceeds.

Fig. 9 is a view in elevation of a drop hammer which may be used either for testing or in the production operation illustrated.

Fig. 10 is a plan view of the device shown in Fig. 9.

Fig. 11 is a sectional elevation view of a test hammer which may be used in the device shown in Figs. 9 and 10.

Fig. 12 is a plan view of the upper end of Fig. 11.

Fig. 13 is a plan view of the lower end of Fig. 11.

Fig. 14 is a sectional elevation of another type of hammer which may be used in the device shown in Figs. 9 and 10 for actual production operations.

Fig. 17 is a view in cross-section illustrating the effect of the blow struck by the ring-shaped end of the testing hammer.

Fig. 18 is a plan view showing the effect on the sample of the concentric blows struck by the ball and ring-shaped ends of the hammer.

Fig. 20 is a view, partly in section, illustrating the welding step as applied to the side sheet and stringers.

Fig. 21 is a view, partly in section, showing the application of the extruding or peening operation to the side sheet and stringers by a tool such as in Fig. 14.

Fig. 22 is a view in plan of the welded sheet and stringer showing the appearance after the application of the present method thereto.

Fig. 23 is a diagrammatic view illustrating the application of the peening step to the fabricated structure by the use of an air hammer.

Fig. 24 is a plan view of the lower end of Fig. 14.

Figure 1:
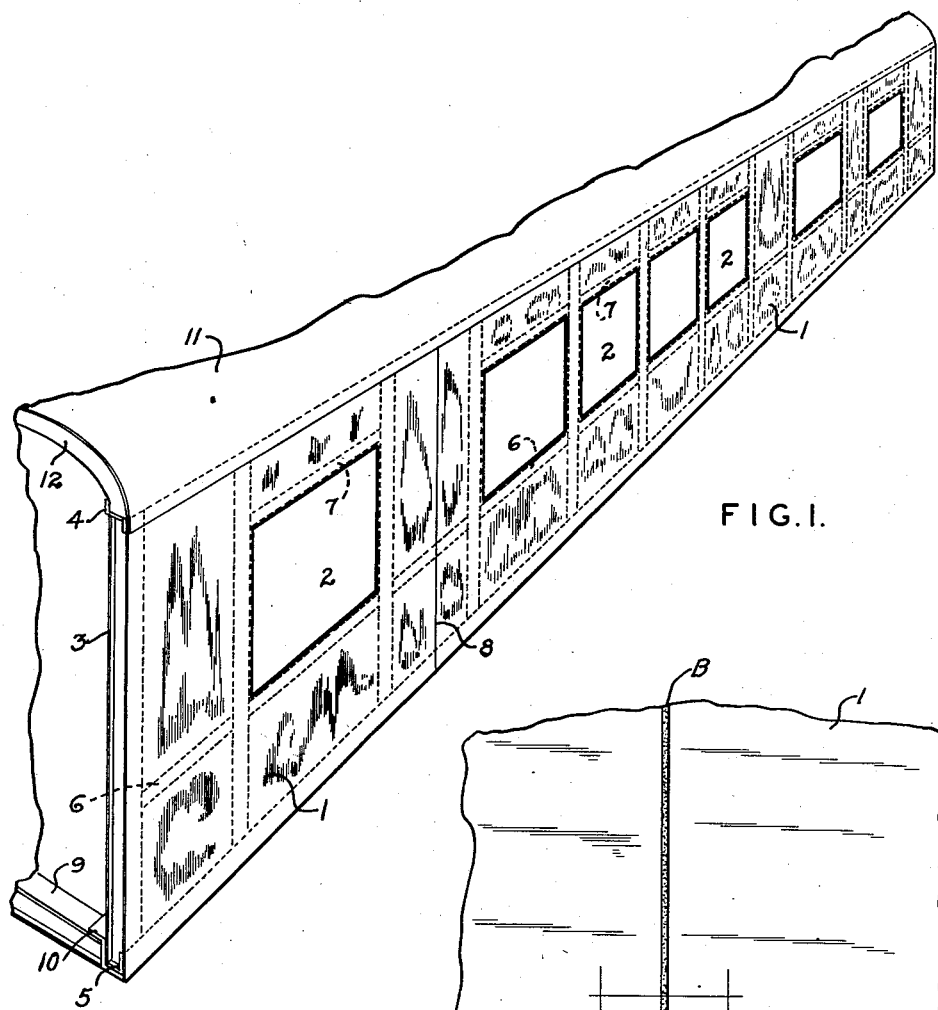
Fig. 1 is an environmental view of a car side in perspective.

This invention relates broadly to the treatment of metal structures whereby they are straightened and to a method which is applicable in production. This application is, in effect, a continuation of my prior application, Serial Number 754,714, filed June 14, 1947, now abandoned. In order to facilitate a better understanding of the invention therein disclosed, several additional views have been added to the present drawings, such as Fig. 1, which illustrates a finished car side fabricated by spot-welding a side sheet to a plurality of side frame members. In this view, 1 indicates the side sheet which is generally of heavy-gauge sheet steel alloy, or the like, provided with the cut-outs 2 to form the window openings. To the back face of the side sheet is welded a frame having a series of vertical posts 3, and the upper and lower margins of the side sheet are spot-welded to other stringers extending longitudinally of the car side. At the top of the sheet a Z stringer 4 is shown forming a side plate, and at the bottom margin of the sheet is spot-welded the bottom chord 5, generally of angle iron configuration. It is usual in the construction to provide a series of stringers 6 adjacent the lower edge of the windows and extending between the several posts 3. These stringers are spot-welded in a position along the line of the belt rail, and are generally termed "intermediate" members. The upper side of the window openings may be provided with window headers 7 spot-welded to the sheet between the vertical posts 3 to reinforce the window opening. It often occurs that a single sheet is not long enough to extend from car end to car end, and, since this frequently occurs, the drawing illustrates a butt weld 8 between the two sheets. It will be understood, however, that the side sheet may not necessarily include a butt weld.

The side sheet, after prefabrication in the above manner, is mounted on the car frame at its lower edge on cross-bearers 9 by a side sill 10 in the form of a Z stringer extending longitudinally of the car and welded face to face with the cross-bearer 9 and the bottom chord 5.

The car side 1 supports the roof 11, which is a curved sheet reinforced by carlines 12.

This view is intended to illustrate conventional railway car construction, wherein the car side is a spot-welded composite structure, and no attempt has been made to eliminate the buckles or ripples in the side sheet resulting from the spot-welding operation. It can readily be seen that the finished appearance of such a car, as indicated by the shading, would be decidedly objectionable.

Figure 2:
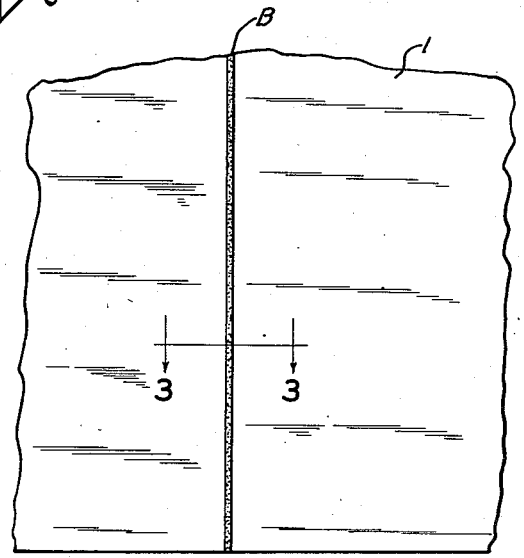
Fig. 2 illustrates a butt-weld in a car side sheet.
Figure 3:
Fig. 3 is a view in cross-section on the line 3—3 of Fig. 2.

In Fig. 2 is illustrated the side sheet 1 adjacent a butt weld B, which may be necessary in order to obtain the proper length side sheet for the entire car side. The butt weld B is more clearly shown in Fig. 3. In order that the effects of the butt weld may be eliminated, it may be necessary to peen the length of the weld B to eliminate the ripples caused in the side sheet 1 due to the change in dimensions produced by the welding operation. This may be performed in any well known manner in order to eliminate the effect illustrated by the shading in Fig. 2. In order to eliminate the ripple effect illustrated in Fig. 1, however, applicant has found the following described process to be entirely satisfactory, especially from a production standpoint.

Figure 4:
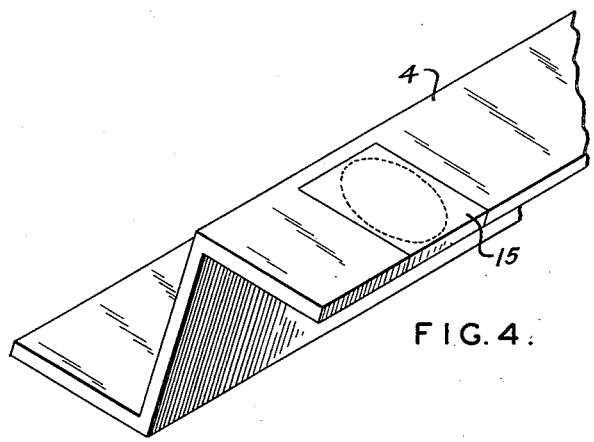
Fig. 4 illustrates how the sampling is performed on a stringer.

In order to practice the invention, it is necessary to predetermine accurately the amount of shrinkage which occurs in both the side sheet and the flange of the frame member due to welding. The manner in which this is done is illustrated in Figs. 4, 5, 6, 7, 8, 15, 16, 17 and 18. In Fig. 4 is illustrated a Z stringer such as may be used in side plate, posts, or intermediate members, etc. It is understood that this stringer may be of any cross-section, and that the selection chosen here is for purposes of illustration only.

Figure 5:
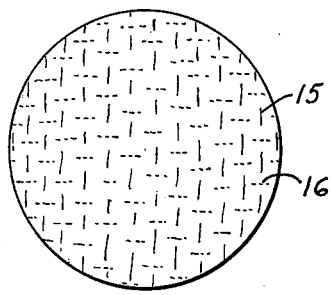
Fig. 5 illustrates a pair of test samples to be welded, with the direction of the grain arranged at right angles.
Figure 6:
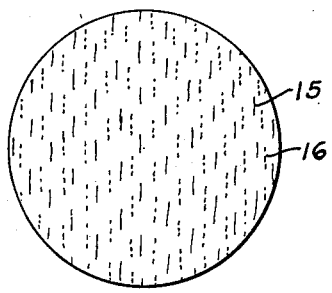
Fig. 6 is a similar illustration with the grain arranged parallel.
Figure 7:
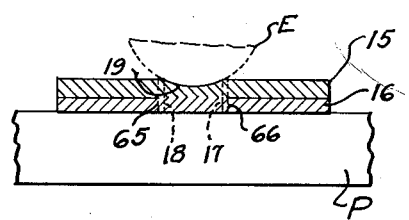
Fig. 7 is a view in cross-section illustrating welding of the pair of test samples.
Figure 8:
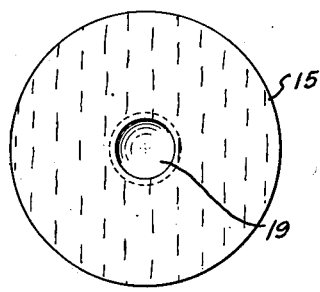
Fig. 8 is a view in plan of a pair of spot-welded test samples.
Figure 16:
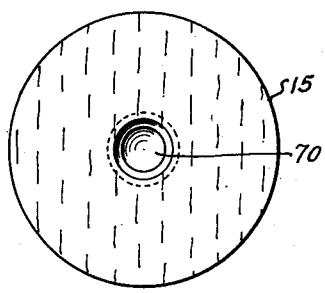
Fig. 16 is a plan view illustrating the effect of the blow in Fig. 15.

A stringer 4 is selected from the stock to be used, and a plurality of samples, which may be square, such as illustrated at 15, are cut from one flange of this relatively heavy framing member. If the flange thickness varies, it will be reflected as an average from the plurality of samples tested. A sufficient number of these sections to reflect this average must be selected. The same sampling method is applied to the material of the side sheet, and then, for convenience in measurement, all of the samples are turned down to round sample disks, so that the measurements can be made with extreme accuracy. Applicant has found that a suitable way of performing this operation of turning may be practiced by cementing to opposite faces of the disks frictional pads of paper, cloth, or the like. Thereafter, the disks are stacked, clamped in a lathe, and turned. The resulting disks are probably as free from distortion due to machining, and as near true round, as possible. From this series of disks, pairs are selected to be spot-welded together. The pairs may be separated into two or more distinct groups, some with the grains running crosswise, as shown in Fig. 5, and the others running parallel, as shown in Fig. 6. A classification is made in this manner, so that the results supplied from the tests as to each class can be applied according to the relation between the grain structures of the reinforcing member and sheet in the car side. These pairs of samples are now welded together, as illustrated in Figs. 7 and 8, with the disk from the frame member 15 mounted on the disk member 16 from the side sheet, so that the electrode E will be applied to the face of the frame member while the platen P is in face-to-face relation with the sample 16 of the side sheet.

The apparatus for performing this spot-welding operation is so well known that it will not be described in detail. However, it will be noted that the electrode E shown diagrammatically in Fig. 7 is typical in construction, and usually of copper, or the like, having a carefully formed spherical welding tip. The radius of this spherical tip may vary, but a one-inch radius is usually satisfactory for welding sheet steel between $\frac{3}{32}$ and $\frac{3}{16}$ of an inch in thickness. These dimensions correspond roughly with the thickness dimensions of the side sheet and framing member illustrated. During the welding process, the metal in the test samples becomes slightly plastic within the area between the dotted lines 17 and 18, with the result that a dent 19 is left in the surface of the upper member of the sample, which, in this case, is preferably the sample from the frame member, and not the side sheet. Also during the process the metal directly between the tip E and the copper table or platen P becomes heated above the critical temperature, and is sufficiently plastic due to the heating to be slightly forged outward under pressure of the welding tip E and the pressure generated by the internal expansion of the metal due to heat. This heated plastic portion is substantially confined to the nugget indicated by the dotted lines 17 and 18. Since the welding operation takes only a few cycles—a small fraction of a second—it seems probable that heat generated in the nugget is not conducted to the surrounding metal in the sample at a sufficient rate to raise it to the critical or plastic temperature.

Thus, according to the theory of my invention, this results in the creation of severe stresses in the nugget and metal immediately surrounding it during cooling. This stressed condition originates, it seems, due to the tendency of the nugget to reduce in size when cooled to normal temperatures. This shrinkage is resisted by the surrounding metal, and the stress in the nugget becomes so great as to strain the surrounding metal immediately adjacent the weld. This strain will decrease outwardly of the nugget in proportion to the square of the radial distance from the nugget. Therefore, adjacent the weld, the strain will be great enough to produce a permanent set in the metal. But, beyond about a half-inch from the outer rim of the nugget, stresses will be so reduced as to be below the yield point of the metal. Accordingly, the metal within this zone is merely compressed by the tension radiating from the nugget, and will return to its original size if and when the tension is relieved.

It has been discovered that the above described compression produced in the metal is revealed by measurements made in the external diameter of the samples before and after welding, and it is readily apparent, therefore, that the cumulative effect of this change in dimensions adjacent each spot weld is responsible for the final appearance of the car side.

The method of this invention contemplates that careful measurement will first be made in the samples to be tested, both in a direction with, and across, the grain of the metal, since it must not be assumed that the disks will be round, no matter how carefully the turning operation is performed, or that changes in dimension will be independent of the grain. The direction of the grain should be carefully marked on each disk, preferably with an arrow in accordance with the grain or rolling mill marks, and also at rightangles to it. The measurement dimensions of each disk should then be recorded to the nearest ten thousandths of an inch. After welding of the disks, measurement should be made at the same points as before, according to the arrows, and the shrinkage of each disk noted.

From what has been set forth above, according to applicant's theory, the dimensions of the sample disks should be restored to their original dimensions by a compressive force applied to expand the nugget and relieve the stress in the metal surrounding the nugget. Although this was tried by the application of both pressing and peening, no uniform result was obtained, although several types of conventionally formed tools were employed. After many tests, it was discovered that a properly applied force, restricted to the area of the nugget, to compress the metal therein, would uniformly restore the lower sample from the sheet to its original dimensions. Likewise, by a tedious process of trial and error, it was found that compressive forces applied exclusive of the nugget of the weld, but surrounding the same, would relieve the strain in the sample from the flange to restore it to its original dimensions before the weld.

In order to determine experimentally the shape of the hammer and the force of the blow required, a simple drop hammer such as shown in Figs. 9 and 10 was used. This hammer consists of a steel base 30 supporting a pair of angle irons 31 and 32 upon legs 33. The angle irons are welded together at one side only, as illustrated at 34, to leave an opening 35 through which extends the handle 36 of a hammer generally indicated as H.

The test hammer of Fig. 11, which may be used in this device to perform the test on the samples, is preferably provided with ferrules 38 and 39 at opposite ends, one of which is used to retain a replaceable steel ball 40. Both ferrules are of selected diameter to freely slide within the space between the angle irons 31 and 32. The opposite end of the hammer is provided with a removable tip 41 held in a bore of the hammer 42 by means of the handle 36, which is provided with a screw-threaded portion 44 engaging the hammer, and a set screw 45 engaging in the groove 46 of the upper end of the tool 41. Thus the handle serves the double purpose of a set screw for the removal of tool 41 and as a lifting handle for the hammer. The testing hammer is either provided with a separate anvil having a ground and polished upper surface or is mounted on the platen P, as in Fig. 9, and the measured and welded disk sample is placed upon the anvil or platen directly beneath the hammer, with the sample from the frame member under the hammer and the sample from the sheet member on the anvil or platen. With this apparatus, the force delivered to the sample may be readily determined by multiplying the weight of the hammer by the height in inches to which it is raised on the scale provided on the apparatus. In making the tests on the sample, care should be taken to centralize the blow of the tool with respect to the center of the spot weld. Obviously, this will not necessarily be in all cases the exact center of the disk sample. After the testing is performed with the ball end of the hammer, it may be removed and reversed to perform the same tests with the ring end 41. In this way the force to be applied by the ball and ring may be separately determined.

Such a hammer is suitable for testing, but, in production operations, a single hammer which will strike on and around the nugget is desirable. A hammer which is suitable for this purpose is shown in Fig. 14. Such a hammer as shown therein has the added advantage of providing concentric blows struck on the sample. This hammer may be used in an air hammer, press, or drop hammer, and may be applied in the manner illustrated, or suspended on a crane or gantry above the car side as it rests on the platen of the welding machine. All that is necessary is that, by whatever mechanism the force is applied, the blow be of predetermined force and point of application.

This hammer has an outer body 50 which, in turn, carries at its lower end a hardened hammer tip 51. The body member 50 is provided with ferrules 52 and 53 at its opposite ends, the latter of which secures the tip 51 securely to the outer body of the hammer. The size of the ferrules 52 and 53 are chosen of suitable dimensions so as to guide the hammer body 50 in the drop hammer of Fig. 9, or to guide the same within a proper air hammer, or the like. Body member 50 is provided with a bore 54 slidably receiving the inner central hammer 55, which, in turn, carries a cylindrical hardened ball tip 56 extending through the base wall of the outer hammer 50 and, in turn, held in place within the inner hammer 55 by a suitable set screw 57. The upper end of the outer hammer 50 is screw-threaded as indicated at 58 to receive the ferrule 52, and the inner hammer is provided with a reduced portion fitting in the opening of that ferrule to provide for limited sliding movement of the hammer 55 within the hammer 50. If the hammer is to be operated manually, the outer body member 50 is provided with a handle 60 screw-threaded thereto. A rubber washer or cushion 61 may be provided to prevent severe shock and injury between the ends of the hammers 55 and 50. The total weight of the casing and inside hammer, together with the size of the ring 51 and ball end 56 will be in accordance with the results of the experiments on the samples. Regardless of which hammer is used in the production process, the design thereof, both as to dimensions and weight, should correspond with the test results on the sample. Where both the side sheet and the post samples are made of $3/32$ high tensile steel, and where the nugget is $5/16$ to $3/8$ of an inch in diameter, it has been found that the proper diameter for the ball 40 and the tip 56 carried by the hammers should be about one and a half inches. Furthermore, a blow for each tool should be delivered approximately equal to an 8-pound hammer dropped 48 inches. This treatment should restore both the top and bottom samples to their original size over an average of not less than about ten individual samples. Of course, variations will be found from sample to sample, especially where the center of the hammer ball does not strike in the exact center of the nugget, but the force of the blow determined from the average is usually sufficiently accurate.

The frame members, however, are not always of the same thickness and material as the side sheet, and, because greater accuracy can be attained during testing, it is preferable to do the peening by separate blows with the hammer of Fig. 11 of suitable shape and weight. For the purpose of any of the tests the following procedure may be followed: A hammer is selected with a ball tip of much smaller radius than the welding tip. For instance, if the welding tip has a one-inch radius, the experiment should be started with a half-inch radius for the tip of the hammer. Selecting the welded samples to be tested, they should be placed upon the anvil of the test hammer with the frame side up and, by trial and error, the force of the blow sufficient to expand the bottom disk of the sample should be determined. In testing, the ball should strike as near as possible to the center of the nugget. Tests should be carried out to determine the average force necessary. The sample should show that approximately eighty percent of the original shrinkage has been removed. This can be readily determined by measuring the lower or bottom disk and comparing these measurements with the original made before the welding was performed. It is important to note that peening in the center of the nugget by a ball having a radius smaller than a welding tip produces the unexpected result of expanding the bottom disk of the sample, and has little effect upon the top disk.

Figure 15:
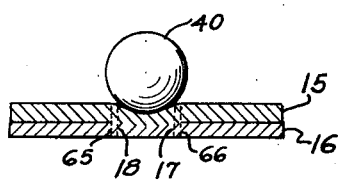
Fig. 15 is a view in cross-section showing the effect of peening performed on the pair of samples of Fig. 8 when subject to the blow struck by the ball end of the testing device.

Referring now to Fig. 15, the ball 40 is shown of smaller diameter than the weld cavity, and the effects of the blow by the ball 40 are shown in this figure, illustrating that the lower or sheet sample has been expanded from its former condition after the weld shown in Fig. 7. In looking at the top of the test sample, the appearance produced by the effect of the blow is readily apparent in Fig. 16.

The next step in the process is illustrated in Figs. 17 and 18. The purpose of this test is to determine the size of the tool 41 and the force of the blow necessary to expand the sample from the frame member 15 a like amount to that already performed on 16. The hammer, such as that shown in Fig. 11, is then reversed to use the ring-shaped end, and set into the bore of the testing machine. The ring 41 at the hammer tip is chosen of a diameter slightly larger than the nugget indicated by the dotted lines 17 and 18, or between $5/8$ and $3/4$ of an inch for $3/32$ high tensile steel. A series of blows are struck which vary in force until the proper impact is determined which will restore the top member 15 to its original size without any material change in the bottom disk 16. It will be understood that the first peening operation has already been performed on the sample.

Since the ring-type hammer has much greater expansive effect on the top sheet or frame sample 15 than the ball has on the bottom member or side sheet sample, it will generally be found that a lighter blow is sufficient and the distance of drop may be decreased. This fact is believed to follow, since the ring-type hammer strikes outside the nugget and the metal will tend to flow because of the internal stress therein, while the ball member striking on the center of the nugget must expand the metal by compression of the weld metal. There is, therefore, greater resistance to produce expanison in the bottom member 16 than in the top member 15.

Referring now to the test samples shown in Figs. 7, 8, 15, 16, 17 and 18, it will be noted with reference to these figures that the round weld nugget defined by the dotted lines 17 and 18 is surrounded by a tube-like critical heat zone indicated by dotted lines 65 and 66. The crystalline structure in the central part of the weld nugget is different from that in the tube-like critical zone between the lines 18—65 and 17—66, and with high tensile steel it is believed to be substantially harder, so that the upper part of this zone in disk 15 tends to form a conduit or layer of resistance through which the metal, displaced by the central hammer blow, is extruded downwardly until it encounters the higher resistance of the hardened anvil which is in face-to-face contact with sample 16. Furthermore, when a ball smaller than the weld nugget is used, the expansive force causes flow on the 45° shear lines, thus resulting in the effect of the hammer blow to direct the forces thereof downwardly through the sample 15 without materially modifying the stresses in the frame sample 15. Thus, the effect is primarily in the expansion or relief of stress in the sheet sample 16. Conversely, the critical zone between the dotted lines 18—65 and 17—66 tends to form a tube-like wall or shield resisting the inward flow of the metal as the result of the blow from the ring-shaped hammer 41, which therefore takes effect primarily in expansion of the frame sample 15, rather than in the sheet sample 16. For this reason it is desirable to form the striking face of the ring-shaped hammer 41 of slightly larger diameter than the tube-like critical zone, as indicated specifically in Figs. 17 and 18. In Fig. 18, for example, the scar left by both the ring-shaped and ball-shaped hammer is shown on the sample, the dotted line indicating the outside of the critical zone in between.

Where the members which reinforce run with and across the grain of the side sheet, separate tests must be made for each condition, and the disks of the samples should be arranged in the first instance as in Fig. 6, and, in the second instance, as in Fig. 5, since it is very likely that different results will be obtained from different grain arrangements with respect to the two classes of samples. It is necessary, in order that tests be accurate, that both be tested.

After the above steps have been performed upon a sufficient number of samples, say ten or more, the results can be averaged, thereby predetermining the force necessary in the operation for the particular size and type of tool. It has been found from these experiments that, generally speaking, the variation of the size of the ball and ring will produce different relative effects on the top and bottom members, the larger the ball, the greater relative effect on the upper member, and the lesser effect on the lower member.

Figure 19:
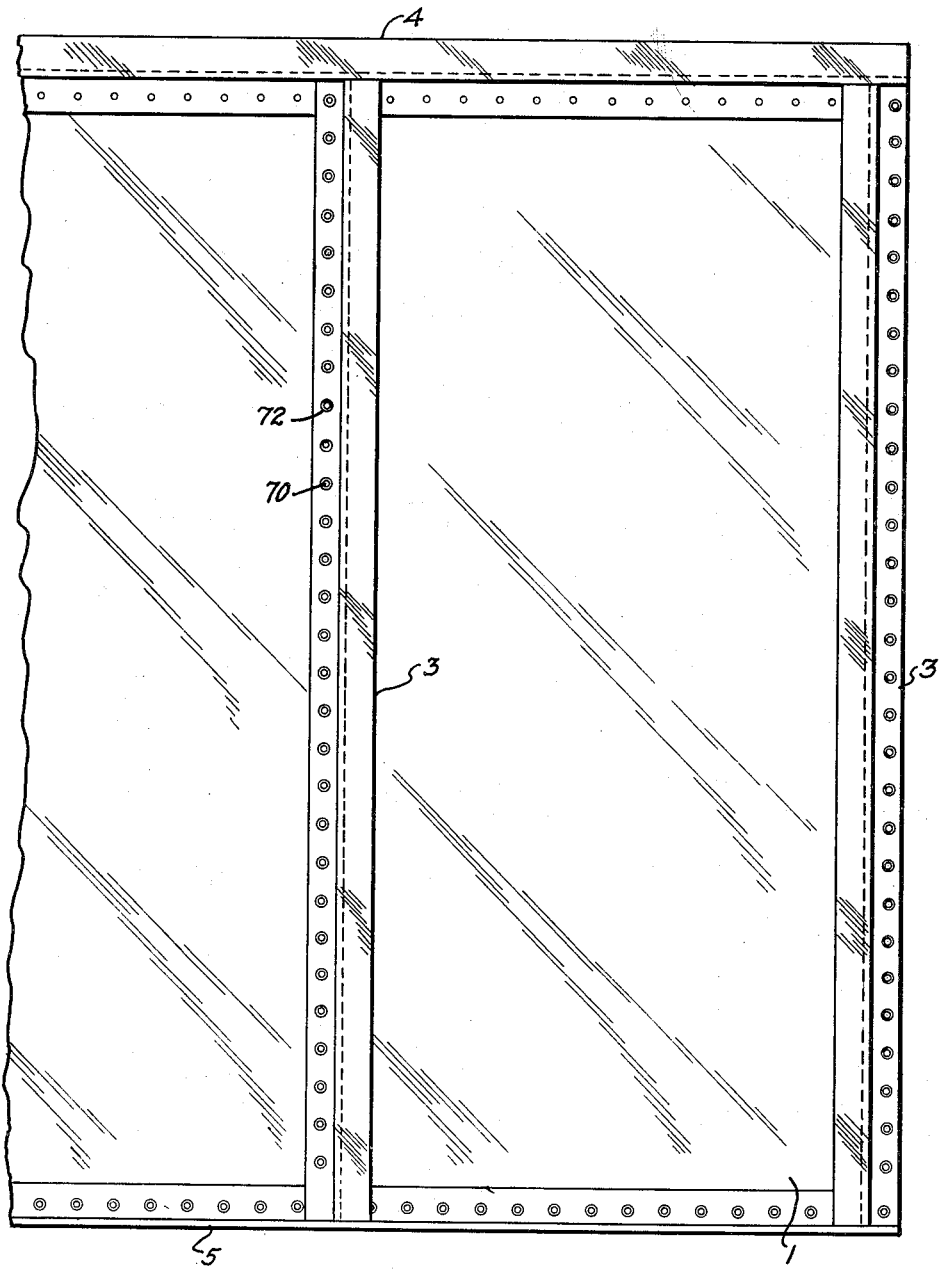
Fig. 19 is a view in plan of the welded side sheet and stringer to which the method has been applied in part, and illustrates the progressive application of the method.

Turning now to Fig. 19, a portion of a reinforced car side is shown. As explained with reference to Fig. 1, the side sheet is indicated at 1, and a typical arrangement of posts, side plate, and bottom chord are illustrated welded in place. The posts are indicated as 3, and have been shown as Z-shaped stringers. A similar shaped stringer is indicated at 4 in the position of the side plate. In this instance, the bottom chord is an angle iron illustrated at 5. Fig. 19 shows the side sheet spot-welded to the frame. It also shows the peening operation applied to the spot welds along the bottom chord and vertical posts, but not along the side plate 4. This illustrates generally the appearance of the final product after peening, as well as before. An attempt has been made by shading in this particular figure to illustrate that the shrinkage along the line of the arc welds can be eliminated by the peening operation. What wrinkles or buckles remain in the sheet run diagonally, indicating that the shrinkage along the side plate 4 has not been relieved.

Referring to Fig. 20, the welding operation along the posts is illustrated. The side sheet is 1, and the posts 3. The welding tip W has just completed a welding operation.

Figs. 21 and 22 show in section and plan the peening step applied to the posts 3 after the welding.

After the determination and selection of the proper size of tool and the force of the blow necessary to restore the samples to an average condition prior to the welding operation, these results are then used in the selection of the tool for production purposes, using, preferably, a hammer such as shown in Fig. 14. The mechanism for delivering the impact is properly adjusted to correspond with the test results on the samples, and then the operator applies the tool and peens each spot weld along the length of the post (see Figs. 9, 21 and 23). This preferably is done before the car side is removed from the platen P. No particular skill is involved in the application of the process, once the test results are determined and the tool size and force of blow are properly adjusted, and any workman may apply the tool as shown on an enlarged scale in Fig. 21 to the sheet and frame structure of Fig. 19. The appearance of the resulting peened weld is shown on an enlarged scale in Fig. 22. It will be noted in Fig. 22 that two concentric, cup-like depressions 70 and 19 will appear in the finished product, especially where a ball smaller than the weld nugget is used. The force of the peening produces the depression 70, and the welding tip the outer, surrounding depression 10. The ring-shaped channel 72 is formed by the blow struck by the tool 51.

About the only adjustment that will be necessary during the peening operation will be determined by the results of the test samples for the cross-grain and parallel-grain relationship, and, of course, these test results will be applied to the frame members whose grain bears the same relationship to that of the sheet 1 as the grain of the two test samples.

One manner, of course, in which the tool shown in Fig. 14 may be used, is in an air hammer. To illustrate this use diagrammatically, reference is made to Fig. 23. Therein an air hammer provided with a barrel 74 receives the tool indicated by the reference character 75. The tool has the usual ring-shaped hammer 51 mounted therein. At the upper end of the barrel 74 is provided a mounting or handle 76, together with a trigger 77. Air for actuation of the hammer is supplied through a tube 78. A preferred hammer is of a one-shot type wherein actuation of the trigger 77 produces a single blow on the tool 75. Such hammers are well known, it is believed, and operate on the principle that the piston within the hammer automatically controls the cut-off after the first blow is initiated by movement of the trigger 77. The intensity of the blow can be regulated by the pressure in supply line 78, for example.

With such a tool properly adjusted to produce a blow in accordance with the tests results, all that is necessary is that the operator properly apply the tool 51 to the spot welds consecutively and operate the trigger 77. In the application of the method described, each peening operation will be found to have restored the shrinkage produced by the spot welding and, although this shrinkage may be as little as .0003 of an inch, the accumulation due to the multiplicity of welds in the length of a car side amounts to a substantial change of dimension. If the sheet has been measured before the application of this method and after the peening has been done, it is well to compare the frame and sheet dimensions before and after. It should also be understood that, if desired, the blow of the ring hammer can be slightly increased so that the frame members will be expanded more than the side sheet. This results in compression in the frame members and places the side sheet under tension. Whereupon, when the completed car side is attached to the car frame as illustrated in Fig. 1, it will be straightened, and, when straightened, will place the sheet under greater tension, thus further tending to eliminate any residual ripples.

A method of treating has been disclosed for composite welded metal structures to relieve the internal strains. This method has been disclosed for a particular purpose; that is, for expanding the metal in and around a spot weld on a particular product, such as a car side, but it is contemplated that other purposes and uses exist which will come within the scope of the invention as defined by the appended claims.

I claim:

1. The method of treating a composite metal structure having a pair of members united in overlapping relation by a series of spot welds which comprises steps of expanding the metal of one of said members adjacent each weld by the application of a predetermined compressive force solely on the weld and directed through the weld and applied to a surface area smaller than the weld at the outer surface of the weld portion on the other of said members, and expanding the metal in said other member by the application of a predetermined compressive force to the surface of said other member in a substantially annular area around the weld but exclusive of the same and adjacent to but beyond the heat affected zone of the weld.

2. The method of producing a reinforced metallic panel structure formed by a panel member and reinforcing member comprising uniting the panel member and reinforcing member by a series of spot welds, and subsequently relieving shrinkage strains in the reinforced panel structure by expanding the metal in a portion of one of said members adjacent each weld by the application of a predetermined compressive force directed through the weld and applied to a surface area smaller than the weld at the outer surface of the weld portion of the other of said members, and expanding the metal in said other member by the application of a predetermined compressive force to a surface area of said other member exclusive of the weld but around the same adjacent to but beyond the heat affected zone of the weld on said other member.

3. The method as set forth in claim 2 wherein the forces are applied to said surface areas simultaneously.

4. The method of producing a composite metal panel comprising the steps of uniting a metal sheet member and a flanged reinforcing metal member by a series of spot welds between the flange and the sheet, and subsequently relieving the contracting strains from the composite panel by expanding the metal of one of said members adjacent each weld by the application of a predetermined compressive force directed only upon and through the weld, applied to a surface area smaller than the weld at the outer surface of the weld portion on the other of said members, and expanding the metal of said other member by the application of a predetermined compressive force to the surface of said other member around the weld but exclusive of the same and adjacent but beyond the heat affected zone of the weld.

5. The method as defined in claim 4 in which the said compressive forces are applied simultaneously.

6. The method as above defined in claim 4 wherein the said compressive forces are applied sequentially in the order recited.

7. The method of producing a composite spot-welded metal panel structure for a car side having a sheet member and a frame member united in overlapping relation by a series of spot welds extending along the sheet, which comprises the steps of expanding the metal of said sheet member adjacent the welds by the application of a predetermined compressive force directed through the welds, applied to a surface area of the welds at the outer surface of the welds on the said frame member, placing said sheet member under tension by expanding the metal of the frame member a greater amount than the sheet member by the application of a predetermined compressive force to the surface of said frame member adjacent to but around the welds.

8. The method of prefabricating a composite spot-welded metal panel to produce a car side without ripples, comprising the steps of sampling the metal from the frame members and sheet members used in forming the composite panel, spot-welding the samples in pairs according to grain arrangement in the composite panel, and then determining the forces necessary to expand the welded pairs to their original pre-welded dimensions by applying a first test compressive force directed through the weld, applied to the surface area of the weld at the outer surface of the welded portion of one of each pair of samples, and by a second test compressive force similarly directed, applied to the same surface around the weld but exclusive of the same and adjacent but beyond the heat affected zone of the weld, and then applying the test results to treat selective portions of the composite welded panel.

9. In a process for producing a smooth surface on a reinforced metallic panel structure formed by welding a metal sheet to a reinforcing member at a plurality of spaced intervals by the steps of superimposing said member on said sheet, applying a welding electrode to the reinforcing member and welding said sheet and member by application of electric current through said electrode; the step of removing the internal strains in the metal sheet adjacent the welds to expand the metal in a portion of the sheet adjacent each weld by the application of predetermined effective compressive forces directed through the weld and applied to a surface area smaller than the contact area of said electrode on the outer surface of the weld portion on said reinforcing member, removing the internal strains to expand the metal in said reinforcing member by the application of predetermined effective compressive forces applied to a surface area of said member exclusive of the weld around the same and adjacent to but beyond the heat affected zone of the weld on said reinforcing member.

10. In a process for producing a smooth surface on a reinforced metallic panel structure formed by welding a metal sheet to a reinforcing member at a plurality of spaced intervals by the steps of superimposing said member on said sheet, applying a welding electrode to the reinforcing member and welding said sheet and member by application of electric current through said electrode; the step of removing the internal strains in the metal adjacent the welds to expand the metal in a portion of the sheet adjacent each weld by the application of predetermined effective compressive forces directed through the weld and applied to a surface area smaller than the contact area of said electrode on the outer surface of the weld portion on said reinforcing member by an impact tool having a convex contact face smaller in diameter than said electrode, and removing the internal strains to expand the metal in said reinforcing member by the application of predetermined effective compressive forces applied to a surface area of said member exclusive of the weld around the same and adjacent to but beyond the heat affected zone of the weld on said reinforcing member.

11. In a process for producing a smooth surface on a reinforced metallic panel structure formed by welding a metal sheet to a reinforcing member at a plurality of spaced intervals by the steps of superimposing said member on said sheet, applying a welding electrode to the reinforcing member and welding said sheet and member by application of electric current through said electrode; the step of removing the internal strains in the metal adjacent the welds to expand the metal in a portion of the sheet adjacent each weld by the application of predetermined effective compressive forces directed through the weld and applied to a surface area smaller than the contact area of said electrode on the outer surface of the weld portion on said reinforcing member by an impact tool having a convex contact face smaller in diameter than said electrode, and removing the internal strains to expand the metal in said reinforcing member by the application of predetermined effective compressive forces applied to a surface area of said member exclusive of the weld around the same and adjacent to but beyond the heat affected zone of the weld on said reinforcing member by an impact tool having a concave face with a rim larger in diameter than said electrode.

References Cited in the file of this patent

UNITED STATES PATENTS

| Number | Name | Date |
|---|---|---|
| 441,276 | Bayles | Nov. 25, 1890 |
| 1,784,866 | Fahrenwald | Dec. 16, 1930 |
| 1,798,738 | Hoern | Mar. 31, 1931 |
| 2,025,922 | Weinrich | Dec. 31, 1935 |
| 2,197,150 | Lambert | Apr. 16, 1940 |
| 2,197,609 | Cornell, Jr. | Apr. 16, 1940 |
| 2,223,799 | Annen | Dec. 3, 1940 |
| 2,288,308 | Williams | June 30, 1942 |
| 2,304,976 | Watter | Dec. 15, 1942 |
| 2,373,871 | Connor | Apr. 17, 1945 |
| 2,431,537 | Bogoslowsky | Nov. 25, 1947 |
| 2,441,858 | Watter | May 18, 1948 |

OTHER REFERENCES

Welding Journal, vol. 23, Jan.–June 1944, Supplement to the Journal of the American Welding Society, Mar. 1944, pp. 122–S, 124–S, 128–S and 129–S.